United States Patent
Kurita et al.

(10) Patent No.: US 11,211,631 B2
(45) Date of Patent: Dec. 28, 2021

(54) FUEL CELL SYSTEM

(71) Applicant: TOYOTA JIDOSHA KABUSHIKI KAISHA, Toyota (JP)

(72) Inventors: Shuji Kurita, Toyota (JP); Yushi Suzuki, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 158 days.

(21) Appl. No.: 16/260,826

(22) Filed: Jan. 29, 2019

(65) Prior Publication Data

US 2019/0267659 A1 Aug. 29, 2019

(30) Foreign Application Priority Data

Feb. 23, 2018 (JP) .............................. JP2018-030325

(51) Int. Cl.
| | |
|---|---|
| *H01M 8/2483* | (2016.01) |
| *H01M 8/04119* | (2016.01) |
| *H01M 8/241* | (2016.01) |
| *H01M 8/2457* | (2016.01) |
| *H01M 8/04089* | (2016.01) |
| *H01M 8/0662* | (2016.01) |

(52) U.S. Cl.
CPC ..... *H01M 8/2483* (2016.02); *H01M 8/04097* (2013.01); *H01M 8/04149* (2013.01); *H01M 8/04156* (2013.01); *H01M 8/0662* (2013.01); *H01M 8/241* (2013.01); *H01M 8/2457* (2016.02); *H01M 2250/20* (2013.01)

(58) Field of Classification Search
CPC ........... H01M 8/04156; H01M 8/0662; H01M 8/04149; H01M 8/241; H01M 8/2457; H01M 2250/20; H01M 8/2483; H01M 8/04097

See application file for complete search history.

(56) References Cited

U.S. PATENT DOCUMENTS

| | | | |
|---|---|---|---|
| 2009/0246597 A1 | 10/2009 | Suzuki et al. | |
| 2012/0189927 A1* | 7/2012 | Kato | H01M 8/04082 429/415 |

(Continued)

FOREIGN PATENT DOCUMENTS

| | | |
|---|---|---|
| JP | 2006-139944 A | 6/2006 |
| JP | 2009-129814 A | 6/2009 |

(Continued)

*Primary Examiner* — Milton I Cano
*Assistant Examiner* — Jenna Shulman
(74) *Attorney, Agent, or Firm* — Oliff PLC

(57) ABSTRACT

A fuel cell system that can prevent impurities from intensively collecting near inlets of fuel cells. The fuel cell system includes a fuel cell stack formed by stacking fuel cells, each fuel cell having a power generation portion, a stack manifold with a fuel gas inlet communication hole disposed at an end of the fuel cell stack in the stacking direction of the fuel cells, a mixed gas supply channel communicating with the fuel gas inlet communication hole for supplying a mixed gas of a fuel gas and fuel off-gas to the fuel cell stack, a stirring mixer for swirling the mixed gas provided in the mixed gas supply channel, and a guide rib provided on the inner wall of the fuel gas inlet communication hole of the stack manifold, on the side opposite to the side of the power generation portions of the fuel cells.

7 Claims, 4 Drawing Sheets

(56) References Cited

U.S. PATENT DOCUMENTS

2016/0141662 A1   5/2016  Takeyama
2017/0117564 A1*  4/2017  Hatakeda .............. H01M 8/241

FOREIGN PATENT DOCUMENTS

| | | |
|---|---|---|
| JP | 2009-152069 A | 7/2009 |
| JP | 2009-164136 A | 7/2009 |
| JP | 2009-238594 A | 10/2009 |
| JP | 2010-282866 A | 12/2010 |
| JP | 2014-078428 A | 5/2014 |
| JP | 2016-96032 A | 5/2016 |

* cited by examiner

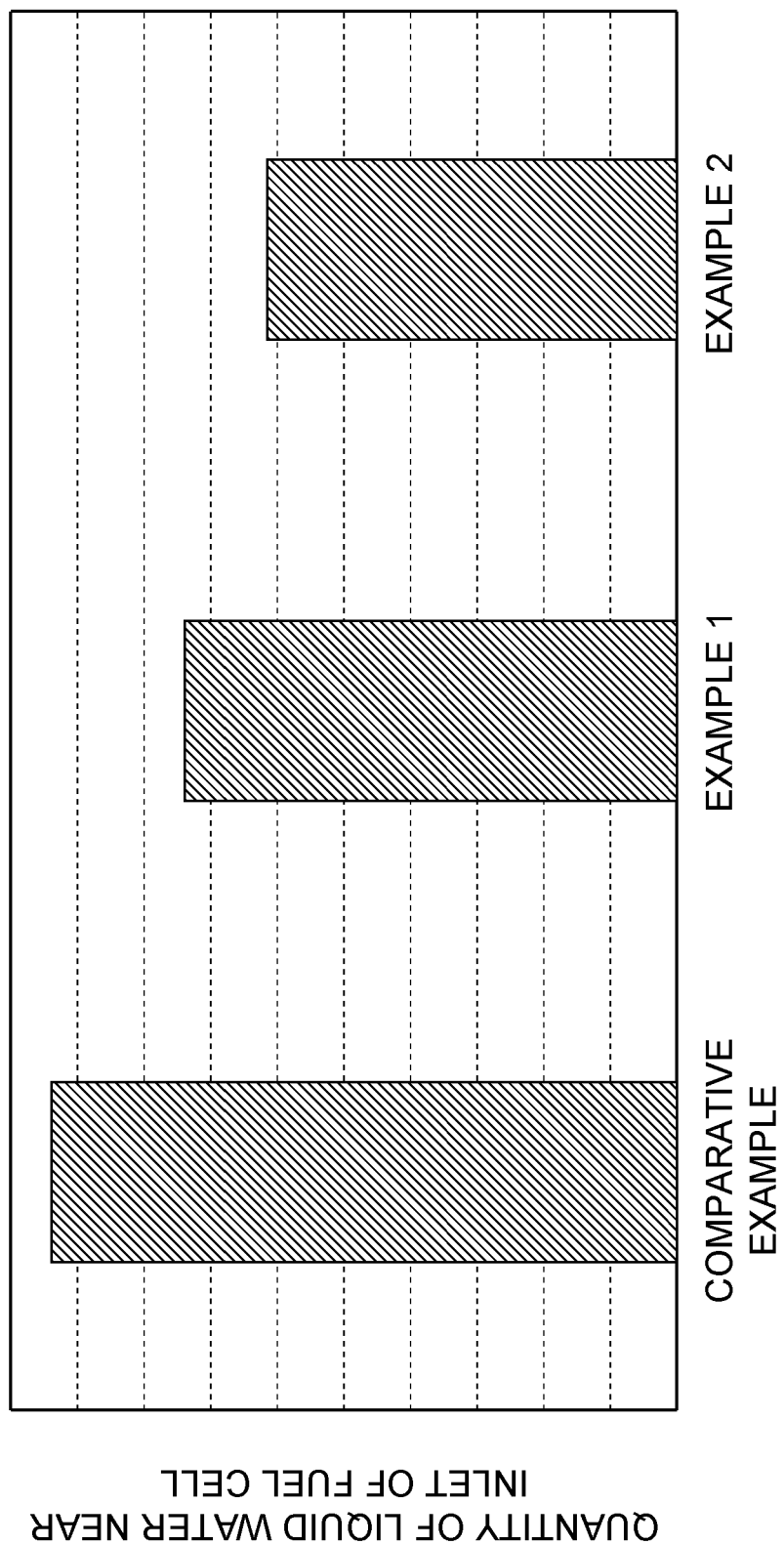

FUEL CELL SYSTEM

CROSS REFERENCE TO RELATED APPLICATIONS

The present application claims priority from Japanese patent application JP 2018-030325 filed on Feb. 23, 2018, the content of which is hereby incorporated by reference into this application.

BACKGROUND

Technical Field

The present disclosure relates to a fuel cell system.

Background Art

As a conventional technique in this field, there has been known a fuel cell system that includes a fuel cell stack formed by stacking a plurality of fuel cells, a fuel gas supply channel that is adapted to supply a fuel gas such as hydrogen to the fuel cell stack, and a circulation channel that is adapted to reflux a fuel off-gas (that is, an unconsumed fuel gas) that has been discharged from the fuel cell stack to the fuel gas supply channel. In the fuel cell system with such a configuration, the fuel off-gas flowing through the circulation channel may possibly contain produced water that has not been fully separated from the off-gas by a gas-liquid separator and impurities, such as metal powder, that have stuck during processes such as assembly of the fuel cell stack. Further, if such impurities enter the fuel cell stack along with the fuel gas flow, the power generating capability of the fuel cells may be deteriorated.

To solve such a problem, various systems have been considered. For example, JP 2009-164136 A discloses a fuel cell system in which a fuel gas and fuel off-gas are made to flow through the inside of a fuel gas supply channel and another flow is further forced to be generated therein, thereby stirring the gas flow so that impurities contained in the fuel off-gas become evenly present therein, and the fuel off-gas with the impurities evenly present therein is then supplied to a fuel cell stack (for example, paragraph 0102 of JP 2009-164136 A).

SUMMARY

However, in the aforementioned fuel cell system, since the flow generated with the incoming fuel off-gas in the fuel gas supply channel becomes spiral, impurities contained in the fuel off-gas may intensively collect near the inlets of the fuel cells.

The present disclosure has been made so as to solve such a technical problem, and provides a fuel cell system that can prevent impurities from intensively collecting near the inlets of the fuel cells.

According to the present disclosure, there is provided a fuel cell system that includes a fuel cell stack formed by stacking a plurality of fuel cells, each fuel cell having a power generation portion; a stack manifold that is disposed at an end of the fuel cell stack in the stacking direction of the fuel cells and that has at least a fuel gas inlet communication hole; a mixed gas supply channel that communicates with the fuel gas inlet communication hole of the stack manifold and that is adapted to supply a mixed gas of a fuel gas and fuel off-gas to the fuel cell stack; a stirring mixer that is provided in the mixed gas supply channel and that is adapted to swirl the mixed gas; and a guide rib that is provided on an inner wall of the fuel gas inlet communication hole of the stack manifold, on a side opposite to a side of the power generation portions of the fuel cells.

In the fuel cell system according to the present disclosure, since the stirring mixer is provided in the mixed gas supply channel, impurities contained in a mixed gas flow toward the side of the fuel cell stack while swirling by the stirring mixer, and the impurities contained in the mixed gas can be moved to the side opposite to the side of the power generation portions of the fuel cells. In addition, since the guide rib is provided on the inner wall of the fuel gas inlet communication hole of the stack manifold, on the side opposite to the side of the power generation portions of the fuel cells, the impurities contained in the mixed gas are further blocked by the guide rib so that they collect at the guide rib. As a result, it becomes possible to prevent the impurities from intensively collecting near the inlets of the fuel cells and to more widely diffuse the impurities in the mixed gas.

In some embodiments of the fuel cell system according to the present disclosure, the stirring mixer is provided in the mixed gas supply channel in a position immediately before the fuel gas inlet communication hole. With such a configuration, impurities contained in a mixed gas can be efficiently moved to the side opposite to the side of the power generation portions of the fuel cells.

In some embodiments of the fuel cell system according to the present disclosure, the guide rib is disposed such that it is perpendicular to the flow of impurities contained in the mixed gas. With such a configuration, it is possible to effectively prevent impurities from intensively collecting near the inlets of the fuel cells.

According to the present disclosure, it is possible to prevent impurities from intensively collecting near the inlets of the fuel cells.

BRIEF DESCRIPTION OF THE DRAWINGS

FIG. 4 is a graph that shows the results of comparison between Examples and Comparative Example.

DETAILED DESCRIPTION

An embodiment of the fuel cell system according to the present disclosure will be described below with reference to the drawings. The fuel cell system according to the present disclosure may be mounted on and used as a drive source for vehicles, vessels, aircrafts, trains, and the like, or used for a power generation facility of buildings.

Figure 1:
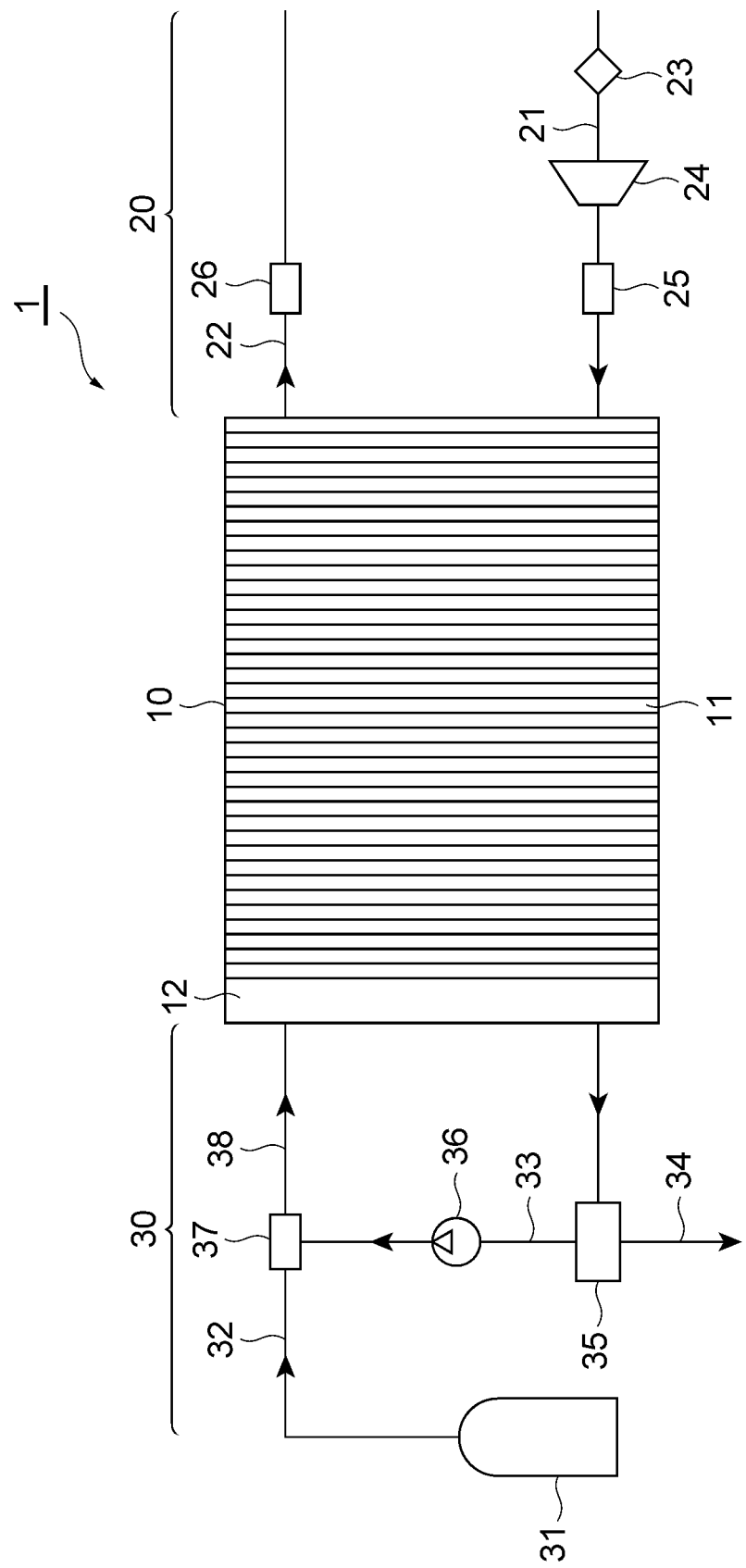
FIG. 1 is a schematic configuration diagram of a fuel cell system according to an embodiment.
Figure 2:
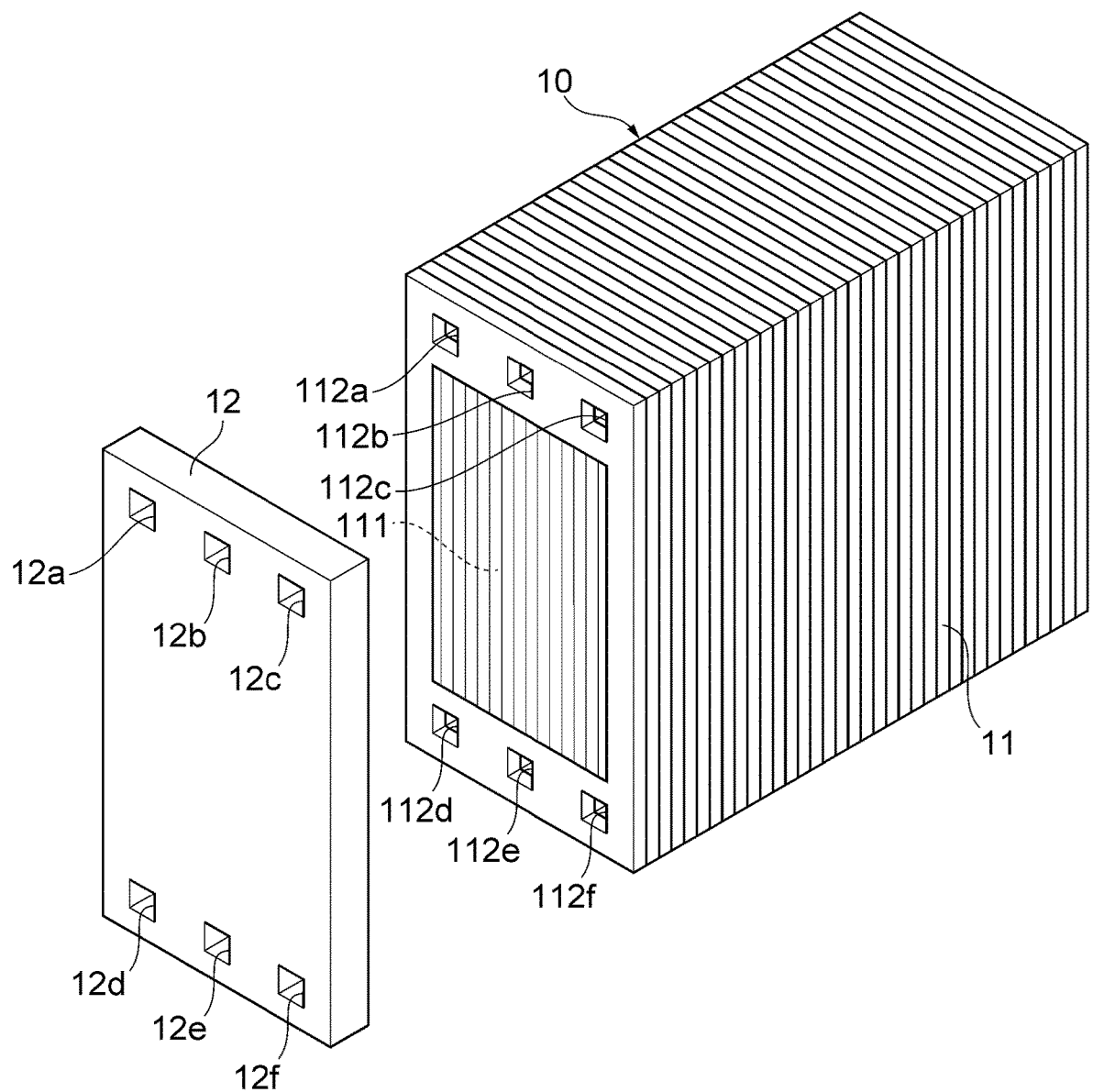
FIG. 2 shows perspective views of a fuel cell stack and a stack manifold.

FIG. 1 is a schematic configuration diagram of a fuel cell system according to an embodiment, and FIG. 2 shows perspective views of a fuel cell stack and a stack manifold. A fuel cell system 1 of the present embodiment mainly includes a fuel cell stack 10, an oxidant gas supply system 20 that is adapted to supply an oxidant gas such as air to the fuel cell stack 10, and a fuel gas supply system 30 that is adapted to supply a fuel gas such as hydrogen to the fuel cell stack 10.

The fuel cell stack 10 is a cell stack formed by stacking a plurality of fuel cells 11 and is a polymer electrolyte fuel cell. Though not shown, each fuel cell 11 has, for example, a membrane electrode assembly (MEA) including an ion-permeable electrolyte membrane and a catalyst layer on the anode side (or an anode electrode) and a catalyst layer on the cathode side (or a cathode electrode) that sandwich the electrolyte membrane. Each fuel cell 11 further includes a pair of separators (that is, separators on the anode and cathode sides) that sandwich the MEA.

Further, gas diffusion layers (GDLs), which are adapted to supply a fuel gas or an oxidant gas to the fuel cells and also to collect electricity generated through an electrochemical reaction, may occasionally be further formed on the opposite sides of the MEA. In this case, the MEA with the GDLs disposed on the opposite sides thereof is referred to as a membrane electrode and gas diffusion layer assembly (MEGA). The MEGA is further sandwiched between the aforementioned separators on the anode and cathode sides. Further, if the MEA has the GDLs, the MEA with the GDLs, that is, the MEGA, is a power generation portion 111 of each fuel cell 11. Meanwhile, if the MEA does not have the GDLs, the MEA is the power generation portion 111 of each fuel cell 11.

As shown in FIG. 2, the power generation portion 111 is disposed in a substantially center position of each fuel cell 11. A fuel gas inlet communication hole 112a, refrigerant outlet communication hole 112b, and oxidant gas outlet communication hole 112c are provided in this order on one side (the upper side in FIG. 2) and an oxidant gas inlet communication hole 112d, refrigerant inlet communication hole 112e, and fuel gas outlet communication hole 112f are provided in this order on the other side (the lower side in FIG. 2) across the power generation portion 111 of each fuel cell 11. These communication holes 112a to 112f are also referred to as manifold holes and are each formed in a rectangular shape.

Further, a stack manifold 12 is disposed at one end of the fuel cell stack 10 in the stacking direction of the fuel cells 11. The stack manifold 12 is formed in a substantially rectangular plate shape with, for example, a metal material such as aluminum, and securely fastened to the fuel cell stack 10 with bolts or the like. The stack manifold 12 is provided with a fuel gas inlet communication hole 12a, refrigerant outlet communication hole 12b, oxidant gas outlet communication hole 12c, oxidant gas inlet communication hole 12d, refrigerant inlet communication hole 12e, and fuel gas outlet communication hole 12f in positions that respectively correspond to the fuel gas inlet communication hole 112a, refrigerant outlet communication hole 112b, oxidant gas outlet communication hole 112c, oxidant gas inlet communication hole 112d, refrigerant inlet communication hole 112e, and fuel gas outlet communication hole 112f of each fuel cell 11.

These communication holes 12a to 12f are each formed in a rectangular shape in the same size as that of their respective communication holes 112a to 112f provided in each fuel cell 11.

As shown in FIG. 1, the oxidant gas supply system 20 includes, for example, an oxidant gas supply channel 21 that is adapted to supply an oxidant gas to the cathode electrode of the fuel cell stack 10, and an oxidant gas discharge channel 22 that is adapted to discharge, from the fuel cell stack 10, an oxidant off-gas generated after an oxidant gas has been supplied to the fuel cell stack 10 and used for an electrochemical reaction in each fuel cell 11. The oxidant gas supply channel 21 communicates with the oxidant gas inlet communication hole 12d of the stack manifold 12 and then with the oxidant gas inlet communication hole 112d of each fuel cell 11. The oxidant gas discharge channel 22 communicates with the oxidant gas outlet communication hole 12c of the stack manifold 12 and then with the oxidant gas outlet communication hole 112c of each fuel cell 11.

The oxidant gas supply channel 21 and oxidant gas discharge channel 22 are each made of, for example, a hose, pipe, and joint member. Further, the oxidant gas supply channel 21 is provided with an air cleaner 23, air compressor 24, intercooler 25, valve, and the like. The oxidant gas discharge channel 22 is provided with a muffler 26, valve, and the like.

Meanwhile, the fuel gas supply system 30 includes, for example, a fuel gas supply source 31 that stores a high-pressure fuel gas such as hydrogen, a fuel gas supply channel 32 that is adapted to supply the fuel gas from the fuel gas supply source 31 to the anode electrode of the fuel cell stack 10, a circulation channel 33 that is adapted to reflux a fuel off-gas (that is, an unconsumed fuel gas) that has been discharged from the fuel cell stack 10 to the fuel gas supply channel 32, and a fuel gas discharge channel 34 that branches from the circulation channel 33 and that is adapted to discharge the fuel off-gas flowing through the circulation channel 33 to the outside. The fuel gas supply channel 32, circulation channel 33, and fuel gas discharge channel 34 are each made of, for example, a hose, pipe, and joint member. Though not shown, the fuel gas supply channel 32 is provided with a pressure gauge, injector, regulator, valve, and the like.

One end of the circulation channel 33 on its upstream side (that is, the side of the fuel cell stack 10) communicates with the fuel gas outlet communication hole 12f of the stack manifold 12 and then with the fuel gas outlet communication hole 112f of each fuel cell 11. The circulation channel 33 is provided with a gas-liquid separator 35, hydrogen circulation pump 36, and the like. The gas-liquid separator 35 is adapted to separate produced water (that is, liquid water) from the fuel-off gas flowing through the circulation channel 33 and store it. The aforementioned fuel gas discharge channel 34 is provided such that it branches from the circulation channel 33 at the gas-liquid separator 35. The hydrogen circulation pump 36 is supplied with the fuel off-gas obtained after gas-liquid separation at the gas-liquid separator 35 and refluxes it to the fuel gas supply channel 32.

The circulation channel 33 is connected to the fuel gas supply channel 32 via a junction pipe 37. The junction pipe 37 is adapted to merge the fuel gas supplied from the fuel gas supply source 31 with the fuel off-gas supplied from the circulation channel 33, and to deliver the merged gas to the fuel cell stack 10. Therefore, the fuel gas supplied from the fuel gas supply source 31 and the fuel off-gas supplied from the circulation channel 33 are mixed together at the junction pipe 37 so as to become a mixed gas. The mixed gas then flows into the fuel cell stack 10 via a mixed gas supply channel 38.

The mixed gas supply channel 38 is a part of the fuel gas supply channel 32, that is, a section of the fuel gas supply channel 32 between the junction pipe 37 and the stack manifold 12. Further, one end of the mixed gas supply channel 38 on its downstream side (that is, the side of the fuel cell stack 10) communicates with the fuel gas inlet communication hole 12a of the stack manifold 12 and then with the fuel gas inlet communication hole 112a of each fuel cell 11.

Though not shown, the fuel cell system 1 of the present embodiment further includes a refrigerant supply channel that is adapted to supply a refrigerant to the fuel cell stack 10 and a refrigerant discharge channel that is adapted to circulate a refrigerant discharged from the fuel cell stack 10 to the side of a radiator. The refrigerant supply channel communicates with the refrigerant inlet communication hole 12e of the stack manifold 12 and then with the refrigerant inlet communication hole 112e of each fuel cell 11. The refrigerant discharge channel communicates with the refrigerant outlet communication hole 12b of the stack manifold 12 and then with the refrigerant outlet communication hole 112b of each fuel cell 11.

Figure 3:
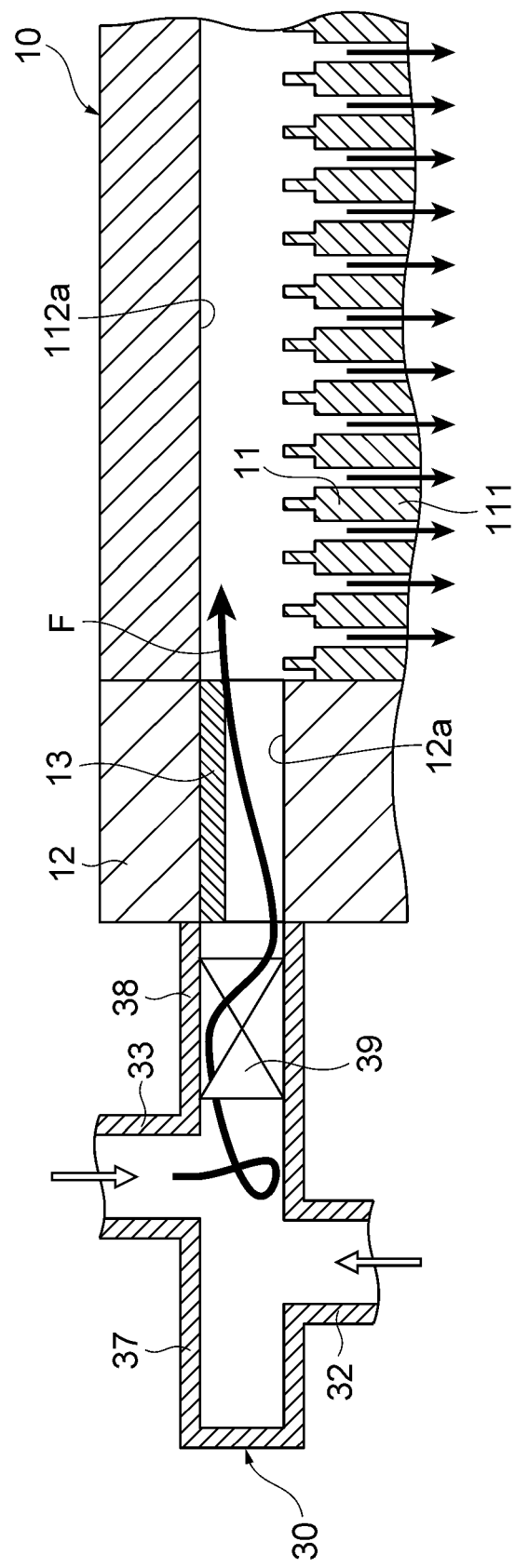
FIG. 3 is a schematic view for illustration of how a stirring mixer and a guide rib are arranged.

Further, the mixed gas supply channel 38 is provided with a stirring mixer 39 that is adapted to stir the mixed gas of the fuel gas and fuel off-gas. Specifically, as shown in FIG. 3, the stirring mixer 39 is disposed inside a pipe that forms the mixed gas supply channel 38, and may be rotatably driven by a motor (not shown) that is disposed outside the pipe, so that a rotational force is applied to the mixed gas flowing through the mixed gas supply channel 38. Herein, the stirring mixer 39 may be provided in a position immediately before the fuel gas inlet communication hole 12a of the stack manifold 12 in the mixed gas supply channel 38.

Furthermore, as shown in FIG. 3, a guide rib 13 is provided on the inner wall of the fuel gas inlet communication hole 12a of the stack manifold 12, on the side opposite to the side of the power generation portions 111 of the fuel cells 11. The guide rib 13 is formed in a plate shape with a resin material, for example, and is secured, with an adhesive or the like, to the side (the upper side in FIG. 3) opposite to the side of the power generation portions 111 on the inner wall of the fuel gas inlet communication hole 12a. The guide rib 13 may be disposed such that it is perpendicular to the flow of impurities contained in the mixed gas.

In the fuel cell system 1 with the aforementioned configuration, since the stirring mixer 39 is provided in the mixed gas supply channel 38, impurities contained in the mixed gas flow toward the fuel cell stack 10 while swirling by the stirring mixer 39 as indicated by an arrow F of FIG. 3, and the impurities contained in the mixed gas can be moved to the side (the upper side in FIG. 3) opposite to the side of the power generation portions 111 of the fuel cells 11.

In addition, since the guide rib 13 is provided on the inner wall of the fuel gas inlet communication hole 12a of the stack manifold 12, on the side opposite to the side of the power generation portions 111 of the fuel cells 11, the impurities contained in the mixed gas are further blocked by the guide rib 13 so that they collect at the guide rib 13. As a result, it becomes possible to prevent the impurities from intensively collecting near the inlets of the fuel cells 11 and to more widely diffuse the impurities in the mixed gas (see the arrow F of FIG. 3).

Further, in the fuel cell system 1 of the present embodiment, since the stirring mixer 39 is provided in the mixed gas supply channel 38 in a position immediately before the fuel gas inlet communication hole 12a, the impurities contained in the mixed gas can be efficiently moved to the side opposite to the side of the power generation portions 111 of the fuel cells 11. Furthermore, since the guide rib 13 is disposed such that it is perpendicular to the flow of the impurities contained in the mixed gas, it is possible to effectively prevent the impurities from intensively collecting near the inlets of the fuel cells 11.

To verify the advantageous effects of the present disclosure, the inventors prepared, using the aforementioned fuel cell system 1, Comparative Example in which the guide rib is not provided on the inner wall of the fuel gas inlet communication hole of the stack manifold, on the side opposite to the side of the power generation portions of the fuel cell stack, Example 1 in which the guide rib is provided on the aforementioned side, and Example 2 in which the guide rib is provided on the aforementioned side such that it is perpendicular to the flow of liquid water contained in the mixed gas. Further, liquid water with the highest percentage of impurities was extracted from each of the aforementioned Comparative Example, Example 1, and Example 2, and the quantity of the liquid water extracted from each example was measured.

FIG. 4 shows the results of comparison of Examples and Comparative Example. FIG. 4 proves that in each of Examples 1 and 2, the quantity of the liquid water near the inlets of the fuel cells was smaller than that of Comparative Example. Specifically, as compared to Comparative Example, the quantity of liquid water of Example 1 was smaller by about 21% and that of Example 2 was smaller by about 35%. These results proved that liquid water can be prevented from intensively collecting near the inlets of the fuel cells when the guide rib is provided. Further, it was found that the quantity of liquid water near the inlets of the fuel cells of Example 2 was further smaller than that of Example 1. The foregoing proved that the advantageous effect of preventing liquid water from intensively collecting near the inlets of the fuel cells can be further improved when the guide rib is provided such that it is positioned perpendicular to the flow of the liquid water contained in the mixed gas.

Although the embodiment of the present disclosure has been described in detail, the specific configuration is not limited thereto, and any design changes are possible without departing from the spirit and scope of the present disclosure described in the claims. For example, the fuel cell stack may be further provided with a dummy cell (a cell that does not generate electricity) in a position adjacent to the stack manifold. Such a configuration can provide the same operational advantages as those in the aforementioned embodiment.

DESCRIPTION OF SYMBOLS

1 Fuel cell system
10 Fuel cell stack
11 Fuel cell
12 Stack manifold
12a Fuel gas inlet communication hole
13 Guide rib
30 Fuel gas supply system
32 Fuel gas supply channel
33 Circulation channel
37 Junction pipe
38 Mixed gas supply channel
39 Stirring mixer
111 Power generation portion
112a Fuel gas inlet communication hole

What is claimed is:

1. A fuel cell system comprising: a fuel cell stack formed by stacking a plurality of fuel cells, each fuel cell having a power generation portion; a stack manifold that is disposed at an end of the fuel cell stack in a stacking direction of the fuel cells and that has at least a fuel gas inlet communication hole; a mixed gas supply channel that communicates with the fuel gas inlet communication hole and that is adapted to supply a mixed gas of a fuel gas and fuel off-gas to the fuel cell stack; a stirring mixer that is provided in the mixed gas supply channel and that is adapted to swirl the mixed gas; and a singular guide rib that is directly fixed to an inner wall of the fuel gas inlet communication hole along an entire surface of the guide rib, the entire guide rib being provided within the fuel gas inlet communication hole and on a first side of the fuel gas inlet communication hole that is positioned opposite to a second side of the fuel gas inlet communication hole that is nearest to the power generation portions of the fuel cells, wherein a surface of the guide rib is parallel to the inner wall of the fuel gas inlet communication hole.

2. The fuel cell system according to claim 1, wherein the stirring mixer is provided in the mixed gas supply channel in a position immediately before the fuel gas inlet communication hole.

3. The fuel cell system according to claim 1, wherein the guide rib is disposed such that it is perpendicular to a flow of impurities contained in the mixed gas.

4. The fuel cell system according to claim 1, wherein the stirring mixer is adapted to apply a rotational force to the mixed gas.

5. The fuel cell system according to claim 1, wherein the stirring mixer is rotatably driven by a motor.

6. The fuel cell system according to claim 1, wherein the guide rib is adapted to collect impurities contained in the mixed gas.

7. The fuel cell system according to claim 1, wherein the stirring mixer is adapted to move the mixed gas in a rotational pattern.

* * * * *